United States Patent
Naelon

(10) Patent No.: US 8,386,502 B2
(45) Date of Patent: Feb. 26, 2013

(54) MARKET IDENTIFICATION SYSTEM

(75) Inventor: Ashley Thomas Naelon, Davidson, NC (US)

(73) Assignee: Bank of America Corporation, Charlotte, NC (US)

( * ) Notice: Subject to any disclaimer, the term of this patent is extended or adjusted under 35 U.S.C. 154(b) by 475 days.

(21) Appl. No.: 12/402,632

(22) Filed: Mar. 12, 2009

(65) Prior Publication Data
US 2010/0235221 A1 Sep. 16, 2010

(51) Int. Cl.
*G06F 17/30* (2006.01)
(52) U.S. Cl. ........ 707/757; 705/7.29; 707/748; 707/754
(58) Field of Classification Search .................. 707/741, 707/748, 754, 757; 705/2, 3, 26, 7.29
See application file for complete search history.

(56) References Cited

U.S. PATENT DOCUMENTS

| | | | |
|---|---|---|---|
| 7,158,979 B2 * | 1/2007 | Iverson et al. | 707/741 |
| 7,376,677 B2 | 5/2008 | Ober et al. | |
| 7,788,147 B2 * | 8/2010 | Haggerty et al. | 705/35 |
| 2005/0108107 A1 * | 5/2005 | Grayson et al. | 705/26 |
| 2008/0133270 A1 * | 6/2008 | Michelson et al. | 705/2 |
| 2008/0189269 A1 | 8/2008 | Olsen | |
| 2009/0132347 A1 * | 5/2009 | Anderson et al. | 705/10 |
| 2009/0313045 A1 * | 12/2009 | Boyce | 705/3 |

OTHER PUBLICATIONS

International Search Report and the Written Opinion of the International Searching Authority mailed May 11, 2010 for International Application No. PCT/US2010/027174.
International Preliminary Report on Patentability for International Application No. PCT/US2010/027174 mailed Sep. 22, 2011.

* cited by examiner

*Primary Examiner* — Khanh Pham
(74) *Attorney, Agent, or Firm* — Michael A. Springs; Moore and Van Allen, PLLC; Jeffrey R. Gray

(57) ABSTRACT

Embodiments of the present invention provide a method and system for providing a marketing identification system by enabling creating an entry for customer data in a way that allows searching of customer attributes, querying the customer data, retrieving data in response to the query, de-identifying and aggregating the retrieved data, and displaying the de-identified and aggregated data in a way that identifies the available market as defined by the query. The invention can be implemented via a stand-alone computing system or such a system interconnected with other platforms or data stores by a network, such as a corporate intranet, a local area network, or the internet.

28 Claims, 2 Drawing Sheets

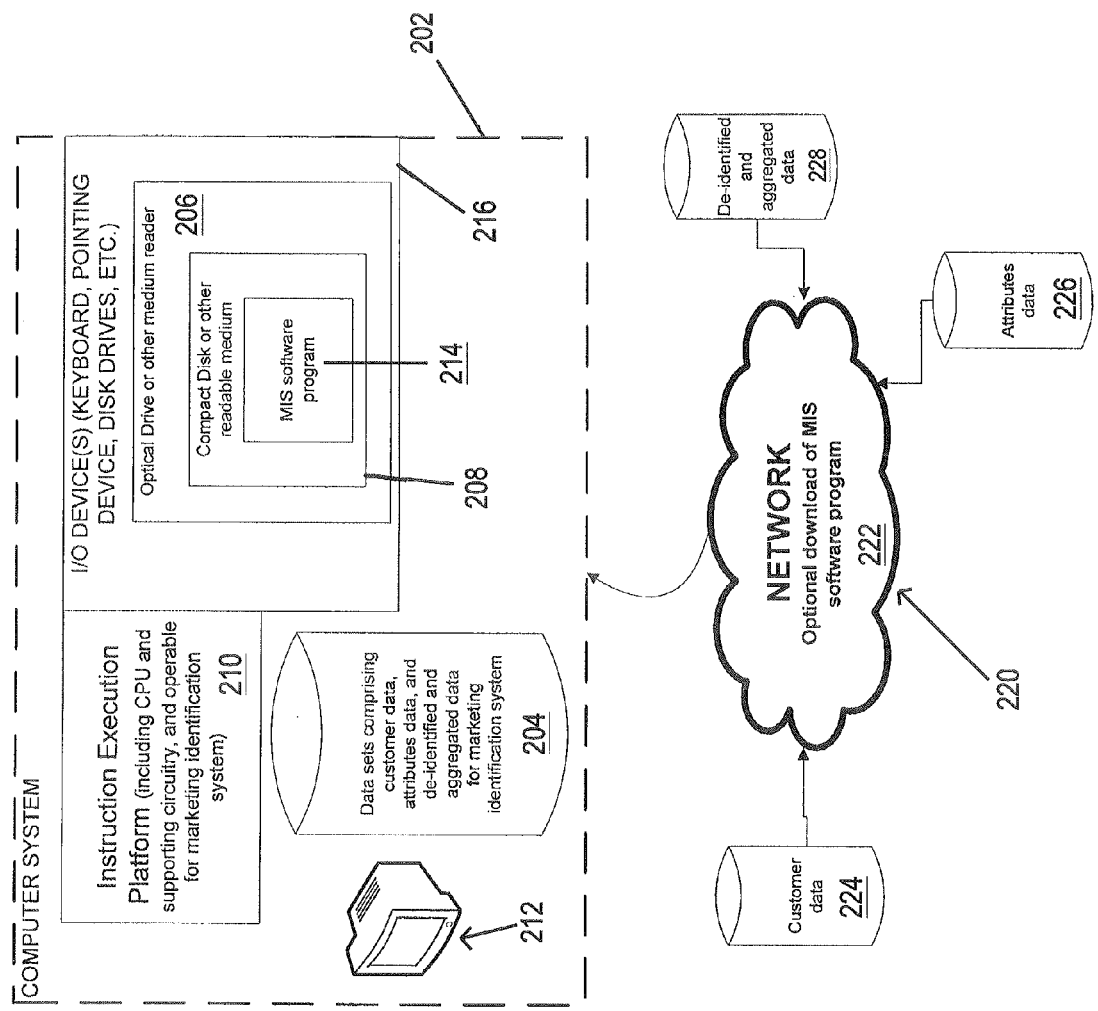

MARKET IDENTIFICATION SYSTEM

BACKGROUND

Identification and determination of market opportunities is critical to succeeding in today's business world. The ability to accurately identify the presence and size of an existing but perhaps untapped market, in a timely manner, is a key element of business success, important to businesses of all sizes and at all stages of the business life cycle.

SUMMARY

Embodiments of the present invention provide a market identification system (MIS) and method. Embodiments of the present invention enable creating an entry for customer data, querying the customer data, retrieving data in response to the query, de-identifying and aggregating the retrieved data, and displaying the de-identified and aggregated data in a way that identifies the available market as defined by the query. The customer may be an individual person or a business.

In at least some embodiments, the query comprises attributes selected from a menu.

In at least some embodiments, the attributes on the menu include customer age, gender, income level, bank account information, loan information, marital status, number of children, birth dates of children, education level, profession, institutions from which degrees were obtained, geographic location, hobbies and language. In some embodiments, the attributes include geographic location(s), type of business, number of employees, number of customers, profit amounts or margins, types of accounts with the financial institution, and types and amounts of loans, debts and obligations.

In at least some embodiments, de-identifying the retrieved data comprises removing private information so that data cannot be associated with a particular customer.

In at least some embodiments, market information is provided by the MIS as a number of potential customers. In some embodiments, market information is provided by the MIS as a number of potential customers within a defined geographic region (e.g., within a city's limits or within a specific zip code region).

In at least some embodiments, the retrieved data is aggregated according to each specific attribute. In some embodiments, the aggregated data for each attribute is assigned a weighted value. In some embodiments, a weighted value is assigned to the overall aggregated data.

In some embodiments, the MIS is accessible via the internet. In some embodiments, the MIS comprises a secure computer environment.

In some embodiments, the invention is implemented via either a stand-alone instruction execution platform or such a platform interconnected with other platforms or data stores by a network, such as a corporate intranet, a local area network, or the internet. A computer program product or computer program products contain computer programs with various instructions to cause the hardware to carry out, at least in part, the methods and processes of the invention. Data sets may include customer data, attributes data, and de-identified and aggregated data. Any comparisons may be made using the data sets. Data sets may be stored locally or accessed over a network.

BRIEF DESCRIPTION OF THE DRAWINGS

FIG. 2 is a system block diagram according to example embodiments of the invention.

DETAILED DESCRIPTION OF THE INVENTION

Figure 1:
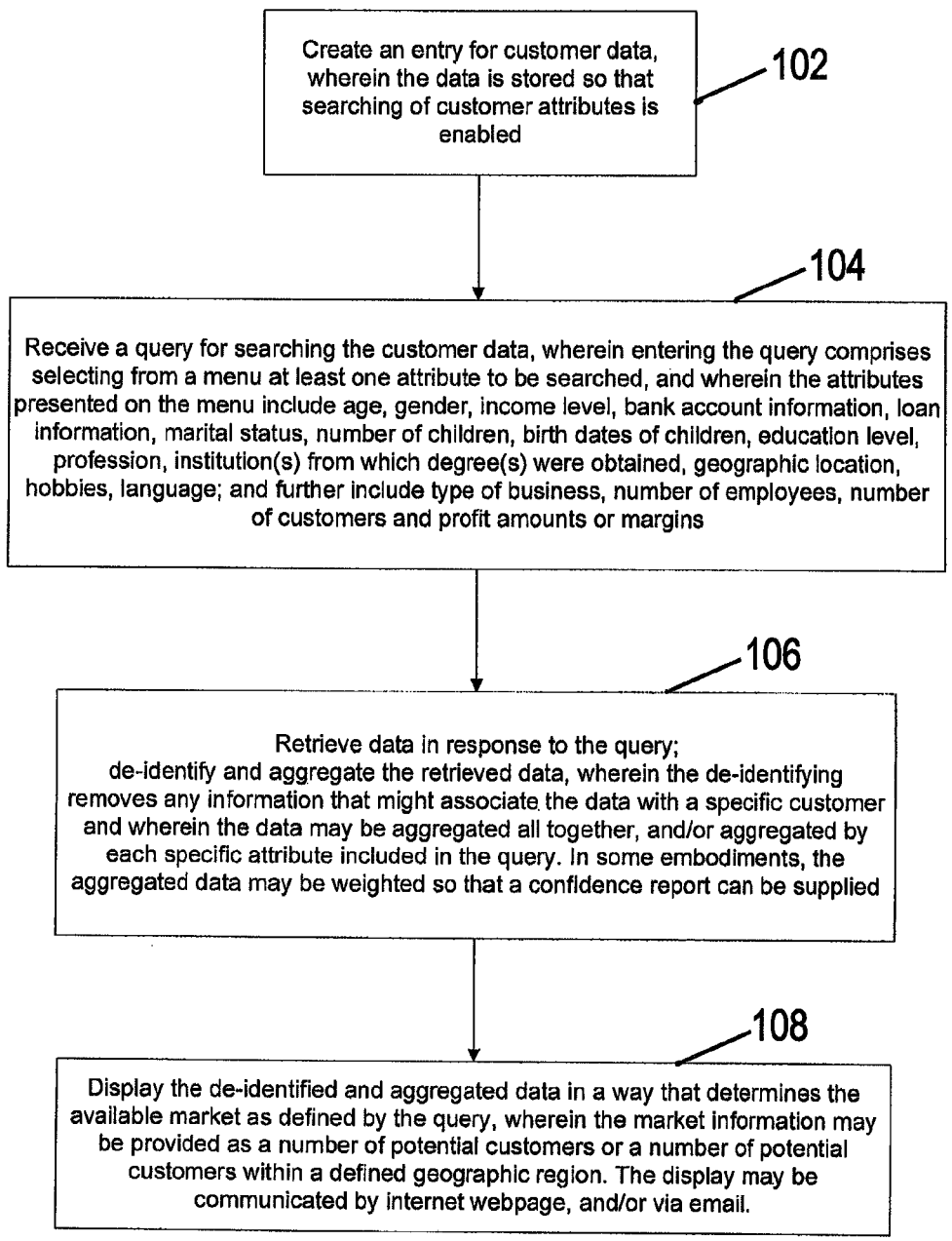
FIG. 1 is a flowchart that illustrates a method of using a market identification system (MIS) according to example embodiments of the invention.

The present invention will now be described in terms of specific, example embodiments. It is to be understood that the invention is not limited to the example embodiments disclosed. It should also be understood that not every feature of the systems and methods described is necessary to implement the invention as claimed in any particular one of the appended claims. Various elements, stages, processes, and features of various embodiments of systems, apparatus, and processes are described in order to fully enable the invention. It should also be understood that throughout this disclosure, where a process or method is shown or described, the steps of the method may be performed in any order or simultaneously, unless it is clear from the context that one step depends on another being performed first. Also, time lags between steps can vary.

The following description is based on an exemplary implementation of an embodiment of the invention in a computer software tool for use in providing a market analysis by a business entity that collects and stores customer data. In some embodiments, the business entity is a financial institution and the individuals and/or businesses who provide the attribute data are financial institution customers. The provision of examples within a financial institution is not meant to be limiting in any way, and the invention may be used in any system wherein a database of appropriate information is housed and accessible by query.

A market identification system (MIS) is a system and computer program product that enables creating an entry for customer data, entering a query to search the customer data, retrieving data based on the query, de-identifying and aggregating the retrieved data, and displaying the de-identified and aggregated data in a way that identifies the available market as defined by the query. Specifically, a MIS designed for use by a financial institution is described below as an exemplary embodiment of the invention.

The MIS works particularly well when utilized by a financial institution, due to the already-existing data that a financial institution has gathered from its customers during the regular course of business. Customer information is critical to the business conducted by a financial institution. For this reason, in addition to regulatory requirements, financial institutions are rigorous with regard to data collection and data storage procedures, and further take great care in keeping customer information up-to-date. Such a thoroughly kept and current database provides an excellent data source for the MIS.

The MIS provides a system for analysis of an available, or potential untapped, market. The MIS can provide market segmentation information, enabling a user to determine whether a desired market exists, and if so, what the size and characteristics of the market are. The user can select a variety of query options in order to define the market as desired. Note that the strength and robustness of the analysis will depend upon the accuracy and completeness of the available data, so the "value" of the market analysis is dependent on the breadth and depth of the data to be queried.

In some embodiments, the query will be conducted by presentation of a menu containing customer attributes from which the user can select. The user may select one or more attributes to query, thus giving the user the ability to define the market based on multiple attributes, if desired.

In some embodiments, the customer attributes presented comprise attributes of individual people such as, but not limited to, age, gender, income level, bank account information (such as minimum or maximum balance, or types of accounts), loan information (such as whether the customer has a mortgage or a new car loan), marital status, number of children, birth dates of children, education level, profession, institutions from which degrees were obtained, geographic location, hobbies, and language.

In some embodiments, the customer attributes presented comprise attributes of small or large businesses. The attributes presented may include geographic location(s), type of business, number of employees, number of customers, profit amounts or margins, types of accounts with the financial institution, and types and amounts of loans, debts and obligations. Business customers and individual customers have some attributes in common, such as name and address.

Queries may be set up to search the data of individual customers only, or to search the data of business customers only, or to search all available customer attributes data.

The aggregated data for each attribute may be assigned a weighted value, or confidence level. The weighted value is used to reflect the robustness of, or confidence in, the data for the attribute. The robustness is a reference to what percentage of the customer population is represented by the aggregated data for a particular characteristic. For example, for some attributes 100% of the customer population will be represented because that particular data is required for any transaction that results in the customer's information being added to the customer database. Aggregated data for such an attribute would be maximally robust because it would be representative of all of the customers whose data are in the database. In some embodiments, such maximally robust data is assigned a value of 100%.

In another example, information regarding a particular attribute may be requested of the customer but not required, or may be required only for certain transactions that would place the individual's data in the customer database. Aggregated data for such an attribute would be less robust, because it would not necessarily have been provided by all of the individuals whose data are contained in the customer database. This weighting is important because without its use in the MIS, absence of data might appear to indicate absence of a market, which may not be reflective of reality. If the aggregated data for a particular attribute is weighted to indicate less robustness, the data analysis then indicates that the market may not exist, or the market may exist but the true size of the market is unknown because the data are not available for each customer represented in the database. The strength of any query results rests on the completeness and quality of the data that is searched.

The data used in the MIS must be de-personalized, or de-identified, before being aggregated and presented to the user of the MIS. In many cases, including the current example wherein the institution that employs the MIS is a financial institution, there will be privacy and security concerns associated with the customer data. In the case of a financial institution, the privacy and security concerns include regulations that must be observed by the financial institution to protect the identity of customers. The term "de-identifying" the data, as used herein, refers to measures taken to remove private information from a customer's information profile so that the data cannot be associated with a particular customer. Examples of removal of such information may include removal of name, address, social security number, account number, loan number, etc. from the final display of the data. Final output formats must comply with privacy and security regulations, and may include display of customer attributes sorted by, for example, age and zip code after de-identifying the data.

As used herein, aggregating the data retrieved based on the query, wherein the aggregated data can be displayed as an overall value or as a separate aggregated value for each specific attribute. As noted above, the user may select one or more attributes to query, giving the user the ability to define the market based on a single attribute or on multiple attributes. The user can thus create a sophisticated market query, defined by the selected attributes.

The MIS displays the data retrieved in a way that identifies the potential market as defined by the query. This may be reported, for example, as a number of potential customers. Potential customers are those whose data fit all of the attributes included in the query. There may be a display indicating the size of the market, for example presented in terms of number of potential customers. If more than one attribute was used to define the market and conduct the query, there may be a display illustrating the aggregated data for each attribute and/or an overall aggregate of the data retrieved by running the query. In some embodiments, the display illustrating the aggregated data for each attribute will include a weighted value that is indicative of the robustness of the aggregated data for the attribute. The display including the weighted value may be presented as a "confidence report" provided for each attribute included in the query. A confidence report (or weighted value) may be assigned to the overall aggregated data. A confidence report for the overall aggregated data may be, for example, an average of the weighted values for each attribute included in the overall aggregated data.

In some embodiments, the geographic features of the market could also be explored. For example, the MIS could be used to find and display the location containing the highest density of potential customers, or could be used to retrieve data restricted to individuals residing in a defined geographic region. Geographic features could be listed, for example, by street address, zip code, city, county, state, region, or country. Any geographic features defined by a user could be used to identify a potential market, such as defining potential customers based on all streets on which there are lakefront homes around a specific lake, or identifying all customers who have access to a particular mode of transportation, such as a specific bus line.

One advantage of using the customer database of an institution such as a financial institution for the MIS is the nature of the relationship between the customer and the financial institution. Such relationships are typically ongoing, lengthy, and thorough with regard to the information provided by the customer to the financial institution over time.

It is of utmost importance to a financial institution to keep thorough and current records of customer information. In some embodiments, the fact that the data used by the MIS is kept up-to-date and current can also be used to identify trends which would be helpful in determining existence of a market. In a financial institution, the customer database may capture all transactions occurring with customers, allowing identification or confirmation of suspected trends. In some cases, it may be helpful to search attributes with a timeline in mind. In other words, data could be retrieved across a defined time period, or for all time that data has been stored, so that trends can be identified. Examples of such trends include, but are not limited to, people relocating from one part of a geographic area to another; an increase in the number of people at a particular income level; and an increase in people of a certain age range in a geographic area.

In some embodiments, all interactions that occur between the user and the financial institution with regard to the MIS occur via the internet. In at least some embodiments, the user can go to a website provided by the financial institution and request a market identification procedure. In some embodiments, the user may be required to log into a secure web environment before requesting the market identification procedure. In some embodiments, the MIS may alert the user via email that his or her MIS results are ready to view. It is important to note that the MIS functions in a way that protects the privacy and integrity of the data in the databases being queried. In the case of a financial institution, the customer data never leaves the financial institution's secure network system. Any data that is sent outside the secure environment, such as in an email to a user of the MIS, is de-identified prior to exiting the secure environment.

FIG. 1 is a flowchart depicting an overview of the MIS in at least some embodiments. An entry is created for customer data 102, wherein the data is stored so that searching of customer attributes is enabled. A customer can be an individual person or a business. This may occur, for example, if an entity, such as a financial institution, conducts a transaction with a customer. In the process of the transaction, information is obtained by the financial institution from the customer. In some embodiments, the customer and the financial institution have an ongoing longterm relationship. Such longterm relationships may allow the financial institution to collect data from the customer over the course of time.

The MIS receives a query for searching the customer data 104. The query comprises selecting at least one attribute to be searched from a menu presented to the user. The attributes presented on the menu include age, gender, income level, bank account information (such as types of accounts and minimum balance), marital status, number of children, birth dates of children, education level, profession, institution(s) from which degree(s) was obtained, geographic location(s), hobbies, language, types of business, number of employees, number of customers, and profit amounts or margins.

Customer data is retrieved in response to the query 106. The retrieved data is then de-identified by removing private information so that the data cannot be associated with specific customers, and then aggregated so that the query results can be reported as a single entity. The aggregation may also comprise aggregations separated by specific attribute, so that a single entity, or value, is reported for each value searched. In some embodiments, the aggregated data may be weighted so that a confidence report can be provided. The confidence report provides an indication of the robustness of the aggregated data value.

The de-identified and aggregated data is displayed in a way that determines the potential market as defined by the query 108. The market may be identified in any way that the user predetermines, and those of ordinary skill in the art would appreciate that there are many different ways that a market could be identified, and the specifics of such identifications fit within the scope of the present invention without changing the intent of the MIS described herein. In some embodiments, the market may be identified by providing a binary feedback, as would be the case if the display merely indicated whether or not a customer population, as defined by the query, exists or not. Existence of a market could also be defined by setting a threshold for whether the market exists. In other words, the MIS user may not feel that a market is worth pursuing unless it is of a predetermined size, such as a customer population of a specified number of potential customers. In some embodiments, the MIS will simply report a number of potential customers.

The market identification procedure may include a number of parameters. The MIS will return query results as requested by the user. The definition of a "market existence" can be determined in any way that a user of MIS wishes, and may include consideration of the confidence report for each attribute queried, or an overall confidence report for the total aggregated data. The de-identified and aggregated data retrieved from the query will be returned to the user. The MIS will not go so far as to declare whether or not a market "exists", as this is a subjective conclusion and will depend on the type of business for which a market is desired, the financial position of the business, the start-up cost of the business, etc. For example, the existence of 50 potential customers present within a particular zip code may be a sufficient customer base for a business with low start-up costs, but may not be sufficient for a business that would require large start-up investments of time and money. Therefore, the MIS will report results factually, such as reporting a number of potential customers, which is the number of customers contained within the database whose data records matched all of the attributes included in the query.

The following description is based on an exemplary implementation of an embodiment of the invention in a financial institution, but it is understood that the present invention could be useful in many different types of businesses and the example herein is not intended to limit the use of the invention to any particular industry. The invention described herein is particularly well suited to use in any business that serves customers, and collects and stores information received from the customers.

As used herein, the term "financial institution" refers to an institution that acts as an agent to provide financial services for its clients or members. Financial institutions generally, but not always, fall under financial regulation from a government authority. Financial institutions include, but are not limited to, banks, building societies, credit unions, stock brokerages, asset management firms, savings and loans, money lending companies, insurance brokerages, insurance underwriters, dealers in securities, and similar businesses. Those of skill in the art will understand that this is not meant to be limiting and that the embodiment as described can be applied at any financial institution.

In summary, and as an exemplary embodiment, a MIS designed for use in a bank is described in more detail. A small business owner is interested in expanding his chain of Spa and Nail salons to northern City, State 1. The business owner wants to know what the population of potential customers is within the defined geographic area. He has determined that for his business, the ideal client profile is a woman in the age range of 25-45 years old, living within a 10 mile radius of zip code XXXXX, with an annual income of $50,000 or more.

The business owner goes to the website of a bank that offers a MIS. The business owner finds the MIS service on the website, signs up for the MIS service, pays for the MIS service, and logs into the MIS service site. The business owner selects query options from a presented menu of attributes. Gender=female; Age=25-45; Address=zip code XXXXX; Income=$50,000 or more. This creates a search query made up of the four selected attributes. The query is treated as an "and" query; that is to say, the only data that will be reported in the results are the matches for those customers for whom all four of the search attributes meet the query profile. In other words, in this case, the only matches that will be reported back to the business owner are those of the customers who are female and are age 25-45 and are living in zip code XXXXX and who have an annual income of $50,000 or more.

Once the query profile has been established by selecting attributes from the menu, the query is passed on to the bank's MIS. The query is then run through the financial institution's customer database to search all records for potential matches. After the query is completed and data has been retrieved, the data is de-identified to remove any personal, private or identifying information, such as name, social security number or street address.

After the de-identification process is complete, the data is aggregated and the MIS report is generated that includes a total number of bank customers who match the query profile as determined by the business owner. A notification is sent to alert the business owner as to the "ready" status of the report. The business owner may then log into the bank's MIS site and view the results of his query. Optionally, the business owner may receive the report via email. The report will include the total number of bank customers who matched the attribute profile searched by the business owner. In the present example, imagine that 1000 customers matched the query profile. Those 1000 bank customers represent potential customers for the business owner's Spa and Nail salon, with "customer" of the Spa and Nail salon defined by the four attributes selected for the query profile.

In the present example, the four attributes used in creating the query profile are weighted as follows for robustness, or level of confidence. Gender is weighted at 70%; that is, only 70% of the bank's customers give their gender when supplying personal information. Age is weighted at 100%, because under regulatory requirements, the bank must have the customer's complete birth date. Zip code is also weighted at 100% because the bank requires that each customer provide the address of their place of residence. And finally, Income is weighted at only 30%, because many customers choose not to, and are not required to, supply this information.

The confidence report supplied with the data retrieved for the Spa and Nail salon owner would be as follows. The overall confidence level in these four attributes, which can also be thought of as the aggregate confidence level, is 75% (the average of the confidence levels for each individual attribute; 70+100+100+30=300, divided by a possible maximum of 400 if the data set for each attribute was 100% complete). So the aggregate score supplied to the business owner would be the total number of customers who matched all four of the attribute criteria searched, plus the aggregate confidence report. A disaggregated confidence report may also be supplied to the business owner, comprising the confidence report for each attribute.

Thus, in this example, the business owner receives a report telling him that there are 1000 potential customers for his Spa and Nail salon in northern City 1 who are female, who are aged 25-45, who live in zip code XXXXX, and who have an annual income of $50,000 or more. Further, the report tells the business owner that there is a confidence level of 75% supporting the reported number of 1000 potential customers.

Note that the total number of potential customers generated by the MIS is conservative, in that it indicates only a minimum number of the potential customers contained in the database. That is to say (referring back to the confidence levels), the business owner can only know the gender of 70% of the bank's customers; therefore, there are most likely more women in the remaining 30% of customers whose gender is not known and who have not been identified by the present query. Further, the business owner can only search the annual income level of the 30% of the bank's customers who provided such information; therefore, there are most likely still more customers whose annual income is not known but who have an annual income level of $50,000 or more. Thus, in this example, the business owner's pool of potential customers is almost certainly greater than the 1000 reported by the MIS.

In at least one embodiment, the MIS is accessible to customers through a bank's major website portal, with no security measures in place. In another embodiment, a link is emailed to an already-existing customer that provides the customer with secure access to the MIS. In still another embodiment, already-existing customers of the bank can securely log into the MIS on the bank's website. In still other embodiments, the customer may be able to access the MIS by any communication means such as in person in the bank lobby, by interactive voice response (IVR), phone, text messaging, mobile device, iris scan, fingerprint scan, or any other channel of communication. However, regardless of how the MIS user interfaces with the MIS, the underlying customer data is never directly available to the MIS user. If the institution supplying the MIS is a financial institution, the underlying customer data is protected in a secure environment at all times and the MIS user does not have access to anything except de-identified data.

FIG. 2 is a system block diagram according to example embodiments of the invention. FIG. 2 actually illustrates two alternative embodiments of the invention. System 202 can be a workstation or personal computer. System 202 can be operated in a "stand-alone" mode. The system includes a fixed storage medium, illustrated graphically at 204, for storing programs and/or macros which enable the use of an embodiment of the invention. In a stand-alone implementation of the invention, fixed storage 204 can also include the data sets which are necessary to implement an embodiment of the invention. In this particular example, the input/output devices 216 include an optical drive 206 connected to the computing platform for loading the appropriate computer program product into system 202 from an optical disk 208. The computer program product includes a computer program or programs with instructions or code for carrying out the methods of the invention. Instruction execution platform 210 of FIG. 2 includes a microprocessor, or central processing unit (CPU), and supporting circuitry and can execute the appropriate instructions and display appropriate screens on display device 212.

FIG. 2 also illustrates another embodiment of the invention in which case the system 220 which is implementing the invention includes a connection to data stores, from which customer data 224, attributes data 226, and de-identified and aggregated data 228 can be retrieved. The connection to the data stores or appropriate databases can be formed in part by network 222, which can be an intranet, virtual private network (VPN) connection, local area network (LAN) connection, or any other type of network resources, including the internet. Data sets can be local, for example on fixed storage 204, or stored on the network, for example in data store 224, 226, or 228.

A computer program which implements all or parts of the invention through the use of systems like those illustrated in FIG. 2 can take the form of a computer program product 214 residing on a computer usable or computer readable storage medium. Such a computer program can be an entire application to perform all of the tasks necessary to carry out the invention, or it can be a macro or plug-in which works with an existing general purpose application such as a spreadsheet or database program. Note that the "medium" may also be a stream of information being retrieved when a processing platform or execution system downloads the computer program instructions through the internet or any other type of network. Computer program instructions which implement the invention can reside on or in any medium that can contain, store, communicate, propagate or transport the program for use by or in connection with any instruction execution system, apparatus, or device. Any suitable computer usable or computer readable medium may be utilized. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires; a tangible medium such as a portable computer diskette, a hard disk, a random access memory (RAM), a read-only memory (ROM), an erasable programmable read-only memory (EPROM or flash memory), a compact disc read-only memory (CD-ROM), or other optical or magnetic storage device; or transmission media such as those supporting the internet or an intranet.

Specific embodiments of an invention are described herein. One of ordinary skill in the computing arts will recognize that the invention can be applied in other environments and in other ways. It should also be understood that an implementation of the invention can include features and elements or steps in addition to those described and claimed herein. Thus, the following claims are not intended to limit the scope of the invention to the specific embodiments described herein.

The invention claimed is:

1. A computerized method of providing a market identification system (MIS), comprising:
    creating, by a processor, an entry for customer data in a data processing system, wherein storage of the customer data enables searching of customer attributes included in the customer data about customers of a financial institution, wherein each of the customer attributes are assigned a confidence level indicating a robustness of the customer attributes that illustrates a representation of a number of customers out of the total number of customers that the customer data is available for each of the customer attributes;
    receiving, by the processor, a query for searching the customer data for the customer attributes about the customers of the financial institution;
    retrieving customer data, by the processor, in response to the query about the customers of the financial institution, wherein the customer data comprises the customers that meet the customer attributes queried;
    de-identifying the retrieved customer data, by the processor, such that the customers of the financial institution that meet the customer attributes cannot be identified;
    aggregating the retrieved customer data, by the processor, wherein aggregating the retrieved customer data comprises combining the customers that meet the customer attributes queried into an available market size and combining the confidence levels for each of the customer attributes queried into an available market confidence level; and
    displaying, by the processor, the available market size and the available market confidence level.

2. The method of claim 1, wherein the customers include both individual people and businesses; and wherein the available market can include the individual people or the businesses.

3. The method of claim 1, wherein the query comprises attributes selected from a menu.

4. The method of claim 1, wherein at least some of the customers are individual people and the customer attributes of the individual people include age, gender, income level, bank account information, loan information, marital status, number of children, birth dates of children, education level, profession, institution from which degree was obtained, geographic location, hobbies and language.

5. The method of claim 1, wherein at least some of the customers are businesses and the customer attributes of the businesses include geographic location(s), type of business, number of employees, number of customers, and types of accounts with the financial institution.

6. The method of claim 1, wherein de-identifying the retrieved customer data comprises removing private information so that the customer data cannot be associated with a particular customer.

7. The method of claim 1, wherein the available market size is a number of potential customers.

8. The method of claim 1, wherein the available market size is a number of potential customers within a defined geographic region.

9. The method of claim 1, further comprising aggregating, by the processor, the data for each specific attribute.

10. The method of claim 9, wherein the confidence level is a percentage.

11. The method of claim 1, wherein the MIS is accessible via the internet.

12. The method of claim 11, wherein all communications between the MIS and a user occur via the internet using internet tools including web pages and email.

13. The method of claim 9, wherein access to the MIS is limited due to a secure environment.

14. A non-transitory computer readable medium having stored thereon a computer program code, the computer program code including instructions which, when executed by a processor, cause the processor to perform the method comprising:
    creating an entry for customer data in a data processing system, wherein storage of the customer data enables searching of customer attributes included in the customer data about customers of a financial institution, wherein each of the customer attributes are assigned a confidence level indicating a robustness of the customer attributes that illustrates a representation of a number of customers out of the total number of customers that the customer data is available for each of the customer attributes;
    receiving a query for searching the customer data for the customer attributes about the customers of the financial institution;
    retrieving customer data in response to the query about the customer of the financial institution, wherein the customer data comprises the customers that meet the customer attributes queried;
    de-identifying the retrieved customer data such that the customers of the financial institution that meet the customer attributes cannot be identified;
    aggregating the retrieved customer data, wherein aggregating the retrieved customer data comprises combining the customers that meet the customer attributes queried into an available market size and combining the confidence levels for each of the customer attributes queried into an available market confidence level; and
    displaying the available market size and the available market confidence level value.

15. The non-transitory computer readable medium of claim 14, wherein the customers include both individual people and businesses; and wherein the available market can include the individual people or the businesses.

16. The non-transitory computer readable medium of claim 14, wherein the query comprises attributes selected from a menu.

17. The non-transitory computer readable medium of claim 14, wherein at least some of the customers are individual people and the customer attributes of the individual people include age, gender, income level, bank account information, loan information, marital status, number of children, birth dates of children, education level, profession, institution from which degree was obtained, geographic location, hobbies and language.

18. The non-transitory computer readable medium of claim 14, wherein at least some of the customers are businesses and the customer attributes of the businesses include geographic location(s), type of business, number of employees, number of customers, and types of accounts with the financial institution.

19. The non-transitory computer readable medium of claim 14, wherein de-identifying the retrieved customer data comprises removing private information so that the customer data cannot be associated with a particular customer.

20. The non-transitory computer readable medium of claim 14, wherein the available market size is a number of potential customers.

21. The non-transitory computer readable medium of claim 14, wherein the available market size is a number of potential customers within a defined geographic region.

22. The non-transitory computer readable medium of claim 14, further comprising aggregating the customer data for each specific attribute.

23. The non-transitory computer readable medium of claim 22, wherein the confidence level is a percentage.

24. The non-transitory computer readable medium of claim 14, wherein the MIS is accessible via the internet.

25. The non-transitory computer readable medium of claim 24, wherein all communications between the MIS and a user occur via the internet using internet tools including web pages and email.

26. The non-transitory computer readable medium of claim 24, wherein access to the MIS is limited due to a secure environment.

27. A system of providing a marketing identification system (MIS), the system comprising:
   a memory device with computer readable instructions stored thereon;
   a processor operatively coupled to the memory device and configured to execute the computer readable instructions to:
   create an entry for customer data about customers of a financial institution, wherein the customer data is stored in to enable searching of customer attributes included in the customer data, wherein each of the customer attributes are assigned a confidence level indicating a robustness of the customer attributes that illustrates a representation of a number of customers out of the total number of customers that the customer data is available for each of the customer attributes,
   receive a query for searching the customer data for the customer attributes about customers of a financial institution,
   retrieve customer data in response to the query about customers of a financial institution, wherein the customer data comprises the customers that meet the customer attributes queried,
   de-identify the retrieved customer data such that the customers of the financial institution that meet the customer attributes cannot be identified,
   aggregate the retrieved customer data, wherein aggregating the retrieved customer data comprises combining the customers that meet the customer attributes queried into an available market size and combining the confidence levels for each of the customer attributes queried into an available market confidence level, and
   display the available market size and the available market confidence level.

28. The system of claim 27, wherein the confidence level is a percentage.

* * * * *